(12) United States Patent
Kato et al.

(10) Patent No.: US 7,418,818 B2
(45) Date of Patent: Sep. 2, 2008

(54) EXHAUST SYSTEM, AND ENGINE DEVICE AND VEHICLE WITH THE SAME

(75) Inventors: Ryusuke Kato, Shizuoka (JP); Toshihiko Takahashi, Shizuoka (JP); Yoshihiko Moriya, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/419,088

(22) Filed: May 18, 2006

(65) Prior Publication Data
US 2006/0266026 A1 Nov. 30, 2006

(30) Foreign Application Priority Data
May 25, 2005 (JP) ............... 2005-152370

(51) Int. Cl.
*F01N 7/00* (2006.01)
(52) U.S. Cl. ............... 60/324; 60/313; 60/323
(58) Field of Classification Search ........... 60/313, 60/323, 324
See application file for complete search history.

(56) References Cited

U.S. PATENT DOCUMENTS

| 4,261,170 | A |   | 4/1981  | Suzuki |        |
|-----------|---|---|---------|--------|--------|
| 5,365,735 | A | * | 11/1994 | Weber et al. | 60/323 |
| 5,976,473 | A | * | 11/1999 | Reck et al. | 422/180 |
| 6,557,343 | B2| * | 5/2003  | Furudate | 60/324 |
| 6,598,390 | B2| * | 7/2003  | Chang | 60/323 |
| 6,837,044 | B2| * | 1/2005  | Kobayashi et al. | 60/323 |

2002/0069643 A1   6/2002   Yoshizawa et al.

FOREIGN PATENT DOCUMENTS

| DE | 2725943 A1 | 12/1978 |
| DE | 19524980 A1 | 1/1997 |
| DE | 20116088 U1 | 1/2002 |
| DE | 10144795 A1 | 4/2003 |
| DE | 10331691 A1 | 2/2005 |
| EP | 0744537 A1 | 11/1996 |
| EP | 1118750 A | 7/2001 |
| JP | 2001-241323 A | 9/2001 |
| JP | 3242488 B | 12/2001 |
| JP | 2002-235540 A | 8/2002 |
| JP | 2002-309930 A | 10/2002 |
| JP | 2004-278401 A | 10/2004 |
| JP | 2004-308443 A | 11/2004 |
| WO | 9107575 A | 5/1991 |
| WO | 9935431 A | 7/1999 |
| WO | 9967513 A | 12/1999 |

OTHER PUBLICATIONS

Official communication issued in the counterpart European Application No. 06010304.1, mailed on Mar. 26, 2007.

\* cited by examiner

*Primary Examiner*—Thomas Denion
*Assistant Examiner*—Diem Tran
(74) *Attorney, Agent, or Firm*—Keating & Bennett, LLP

(57) ABSTRACT

An exhaust system includes a first exhaust pipe group, a first catalyst device, and a second exhaust pipe group. A first coupling pipe of the first exhaust pipe group includes spaces in communication with respective first exhaust pipes. A second coupling pipe of the second exhaust pipe group includes spaces in communication with respective second exhaust pipes. The first exhaust pipe group and the second exhaust pipe group are joined such that the respective spaces are opposed to one another, with the first catalyst device interposed therebetween.

15 Claims, 10 Drawing Sheets

F I G . 9
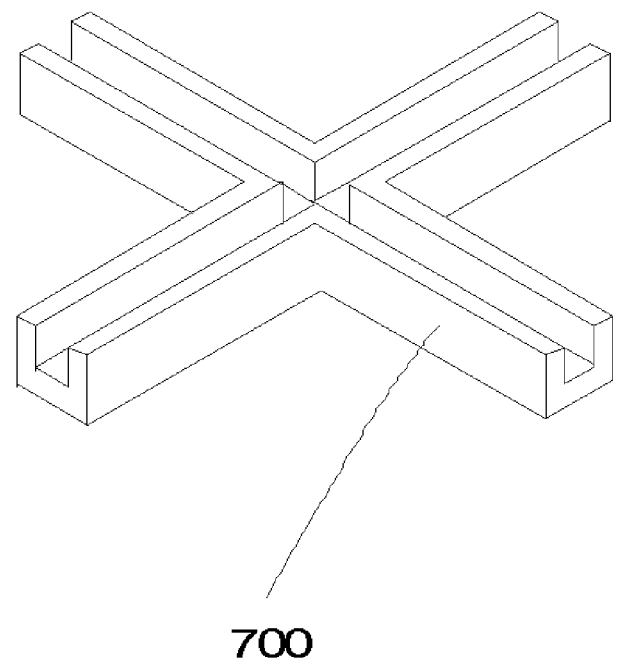
700

EXHAUST SYSTEM, AND ENGINE DEVICE AND VEHICLE WITH THE SAME

BACKGROUND OF THE INVENTION

1. Field of the Invention

The present invention relates to an exhaust system that exhausts exhaust gas from an engine, and an engine device and a vehicle with the same.

2. Description of the Background Art

Conventionally, a catalyst device has been provided in an exhaust system to remove harmful substances contained in the exhaust gas emitted from an engine.

In order to quickly activate the catalyst device, the temperature of the catalyst needs to be rapidly increased in a short period of time. Consequently, there has been developed an exhaust system in which the catalyst device is arranged closer to the engine, so that high temperature exhaust gas flows into the catalyst.

For example, in an exhaust system with a catalyst in a motorcycle described in JP 3242488 B, auxiliary oxidation catalysts are provided in a front exhaust pipe and a rear exhaust pipe connected to a front cylinder and a rear cylinder of a V-type two cylinder engine. However, in the configuration described in JP 3242488 B, the auxiliary oxidation catalysts need to be increased in number with an increase in the number of the cylinders of the engine, which increases the manufacturing cost.

As a method to solve such a problem, there is a method in which exhaust pipes of a plurality of cylinders are merged into one exhaust pipe and a catalyst device is provided at this portion where the exhaust pipes are merged (e.g., JP 2001-241323 A and JP 2002-309930 A). This can reduce the number of catalyst devices to be installed.

In an exhaust treatment device of the exhaust gas of an internal combustion engine described in JP 2001-241323 A, exhaust pipes of first and third cylinders, in the order of ignition, are merged into one chamber to cause the exhaust gas to flow into a catalyst device through this chamber. Furthermore, exhaust pipes of second and fourth cylinders, in the order of ignition, are merged into the other chamber to cause the exhaust gas to flow into a catalyst device from this chamber.

In an integral dual catalyst exhaust manifold described in JP 2002-309930 A, exhaust pipes coupled to a first cylinder and a fourth cylinder are merged to connect to a first catalyst container, and exhaust pipes coupled to a second cylinder and a third cylinder are merged to connect to a second catalyst container.

Meanwhile, when the exhaust pipes of the plurality of cylinders are merged into one exhaust pipe, exhaust gas pressure interference occurs at the merging portion. The output performance of the engine is largely influenced by a length of the exhaust pipes to the merging portion where this exhaust gas pressure interference occurs. FIG. 10 is a chart for explaining a change in the output characteristics of an engine resulting from varying the exhaust pipe length to the merging portion. In FIG. 10, the horizontal axis indicates the engine speed and the vertical axis indicates a generated torque of the engine. Furthermore, the dotted line indicates an output characteristic of the engine in the case where the exhaust pipe length leading to the merging portion is long, and the solid line indicates an output characteristic of the engine in the case where the exhaust pipe length leading to the merging portion is short.

Generally, in the case where the length of the exhaust pipes leading to the merging portion is long, the generated torque of the engine becomes highest in a region where the engine speed is low as shown in FIG. 10. On the other hand, in the case where the length of the exhaust pipes leading to the merging portion is short, the generated torque of the engine becomes highest in a region where the engine speed is high as shown in FIG. 10. That is, in such a vehicle where it is desirable to have a large generated torque of the engine at a low speed, the length of the exhaust pipes leading to the merging portion is preferably long, while in such a vehicle where it is desirable to have a large generated torque of the engine at a high speed, the length of the exhaust pipes leading to the merging portion is preferably short.

However, in the configurations of the exhaust pipes described in the above-described JP 2001-241323 A and JP 2002-309930 A, if the length leading to the merging portion of each of the exhaust pipes becomes long, a distance between the engine and the catalyst becomes long, so that a temperature of the exhaust gas decreases before the exhaust gas reaches the catalyst. In this case, the catalyst cannot be quickly activated.

SUMMARY OF THE INVENTION

In order to overcome the problems described above, preferred embodiments of the present invention provide an exhaust system that can activate a catalyst quickly while preventing a reduction in output performance of an engine at medium and low speeds, and an engine device and a vehicle with the same.

An exhaust system according to a preferred embodiment of the present invention is an exhaust system that exhausts gas from a plurality of cylinders of an engine, including a same number of first exhaust pipes as the plurality of cylinders into which the gas exhausted from the plurality of cylinders flows, respectively, a first catalyst device having a first catalyst that cleanses the gas introduced through the plurality of first exhaust pipes, a same number of second exhaust pipes as the plurality of cylinders which are provided corresponding to the plurality of first exhaust pipes, respectively, a first coupler that assembles first ends of the plurality of first exhaust pipes and couples the first ends to one end of the first catalyst device, and a second coupler that assembles first ends of the plurality of second exhaust pipes and couples the first ends to another end of the first catalyst device. The first coupler has a same number of first inflow portions as the plurality of cylinders that cause the gas flowing out of the plurality of first exhaust pipes to flow into the first catalyst device, respectively, the second coupler has a same number of second inflow portions as the plurality of cylinders that cause the gas flowing out of the first catalyst device to flow into the plurality of second exhaust pipes, respectively, the first coupler is connected to the first catalyst device such that the plurality of first inflow portions are not in communication with each other, the second coupler is connected to the first catalyst device such that the plurality of second inflow portions are not in communication with each other, and the plurality of second inflow portions are arranged so as to be opposed to the plurality of first inflow portions, respectively, with the first catalyst device interposed therebetween.

In the exhaust system of this preferred embodiment of the present invention, the gas exhausted from the plurality of cylinders of the engine flows into the plurality of first exhaust pipes, respectively. The gas flowing into the plurality of first exhaust pipes flows into the first catalyst device through the plurality of first inflow portions of the first coupler, respectively. The gas cleansed in the first catalyst device flows into the plurality of second exhaust pipes through the plurality of second inflow portions of the second coupler, respectively.

The first coupler is connected to the first catalyst device such that the plurality of first inflow portions are not in communication with each other. The second coupler is connected to the first catalyst device such that the plurality of second inflow portions are not in communication with each other. The plurality of second inflow portions are arranged so as to be opposed to the plurality of first inflow portions, respectively, with the first catalyst device interposed therebetween.

In this case, the gas flowing into the first catalyst device from the respective first inflow portions passes through the first catalyst device and then, flows into the second inflow portions arranged at the opposed positions. Here, since the plurality of first inflow portions are not in communication with each other, the gases introduced through the plurality of first exhaust pipes are prevented from interfering with one another in the first coupler when the gases flow into the first catalyst device from the first inflow portions. Furthermore, since the plurality of second inflow portions are not in communication with each other, the gases introduced through the plurality of first exhaust pipes are prevented from interfering with one another in the second coupler when the gases flow into the second inflow portions from the first catalyst device. Accordingly, even if the first catalyst device is arranged close to the engine in order to cause the high temperature gas to flow into the first catalyst, pressure interference of the gas is prevented from occurring in the coupling portion between the plurality of first exhaust pipes and the first catalyst device and the coupling portion between the first catalyst device and the plurality of the second exhaust pipes. This allows the catalyst to be activated quickly while preventing a reduction in the output performance of the engine at medium and low speeds.

Furthermore, since the catalyst device does not need to be provided for each of the plurality of the first exhaust pipes, a total surface area of the catalysts provided in the exhaust system is prevented from increasing. Since this also prevents an increase in heat quantity radiating from a surface of the first catalyst, the temperature of the first catalyst can be easily raised. As a result, the first catalyst can be activated quickly.

The first catalyst may have a plurality of flow paths communicating between the first coupler and the second coupler, and the respective plurality of flow paths may be separated and not in communication with each other.

In this case, the gas introduced through the first exhaust pipes is brought from the first coupler to the second coupler through the plurality of flow paths. Here, since the plurality of flow paths are separated from one another and are not in communication with each other, the gases introduced through the plurality of first exhaust pipes are prevented from interfering with one another in the first catalyst device. This can surely prevent a reduction in the output performance of the engine at medium and low speeds.

Each of the plurality of flow paths may be in communication with each of the first inflow portions and the second inflow portion opposed to the first inflow portion.

In this case, the gas flowing from the first inflow portion can be surely brought to the second inflow portion opposed to the first inflow portion. This can surely prevent pressure interference of the gas from occurring in the connection portion between the first catalyst device and the second coupler. As a result, this can reliably prevent a reduction in the output performance of the engine at medium and low speeds.

The first coupler may preferably have a first substantially cylindrical body and a first partition that divides the inside of the first substantially cylindrical body into the same number of first inflow portions as the plurality of first exhaust pipes, and the second coupler may have a second substantially cylindrical body and a second partition that divides the inside of the second substantially cylindrical body into the same number of second inflow portions as the plurality of second exhaust pipes.

In this case, the plurality of first and second inflow portions can be easily formed without making the structures of the first and second couplers complex.

An area of each first inflow portion may be equal to an area of each second inflow portion opposed to the first inflow portion.

In this case, the gas introduced through each of the first exhaust pipes can be surely brought to each of the corresponding second exhaust pipes. This can surely prevent the gases introduced through the plurality of first exhaust pipes from interfering with one another in the second coupler.

The exhaust device may further include a third coupler that assembles second end portions of the plurality of second exhaust pipes, and a second catalyst device that is connected to the third coupler and has a second catalyst for cleansing the gas introduced through the plurality of second exhaust pipes.

In this case, the gas introduced through the plurality of second exhaust pipes is cleansed by the second catalyst device. This allows harmful substances of the gas to be surely removed.

An engine device according to another preferred embodiment of the present invention includes an engine having a plurality of cylinders, and an exhaust system that exhausts gas from the plurality of cylinders of the engine, the exhaust system including a same number of first exhaust pipes as the plurality of cylinders, into which the gas exhausted from the plurality of cylinders flows, respectively, a first catalyst device having a first catalyst that cleanses the gas introduced through the plurality of first exhaust pipes, a same number of second exhaust pipes as the plurality of cylinders, which are provided corresponding to the plurality of first exhaust pipes, respectively, a first coupler that assembles first ends of the plurality of first exhaust pipes and couples the first ends to the first catalyst device, and a second coupler that assembles first ends of the plurality of second exhaust pipes and couples the first ends to the first catalyst device. The first coupler has a same number of first inflow portions as the plurality of cylinders that cause the gas flowing out of the plurality of first exhaust pipes to flow into the first catalyst device, respectively, the second coupler has a same number of second inflow portions as the plurality of cylinders that cause the gas flowing out of the first catalyst device to flow into the plurality of second exhaust pipes, respectively, the first coupler is connected to the first catalyst device such that the plurality of first inflow portions are not in communication with each other, the second coupler is connected to the first catalyst device such that the plurality of second inflow portions are not in communication with each other, and the plurality of second inflow portions are arranged so as to be opposed to the plurality of first inflow portions, respectively, with the first catalyst device interposed therebetween.

In the engine device, the above-described exhaust system is connected to the engine having the plurality of cylinders. Accordingly, the gas exhausted from the plurality of cylinders of the engine flows into the plurality of first exhaust pipes, respectively. The gas flowing into the plurality of first exhaust pipes flows into the first catalyst device through the plurality of first inflow portions of the first coupler, respectively. The gas cleansed in the first catalyst device flows into the plurality of second exhaust pipes through the plurality of second inflow portions of the second coupler.

The first coupler is connected to the first catalyst device such that the plurality of first inflow portions are not in communication with each other. The second coupler is connected to the first catalyst device such that the plurality of second inflow portions are not in communication with each other. The plurality of second inflow portions are arranged so as to be opposed to the plurality of first inflow portions, with the first catalyst device interposed therebetween.

In this case, the gas flowing into the first catalyst device from the respective first inflow portions passes through the first catalyst device, and then, flows into the second inflow portions arranged at the opposed positions, respectively. Since the plurality of first inflow portions are not in communication with each other, the gases introduced through the plurality of first exhaust pipes are prevented from interfering with one another in the first coupler when the gases flow into the first catalyst device from the first inflow portions. Furthermore, since the plurality of second inflow portions are not in communication with each other, the gases introduced through the plurality of first exhaust pipes are prevented from interfering with one another in the second coupler when the gases flow into the plurality of second inflow portions from the first catalyst device. Accordingly, even if the first catalyst device is arranged close to the engine in order to cause the high temperature gas to flow into the first catalyst, pressure interference of the gas is prevented from occurring in the coupling portion between the plurality of first exhaust pipes and the first catalyst device and the coupling portion between the first catalyst device and the plurality of the second exhaust pipes. This allows the catalyst to be activated quickly while preventing a reduction in the output performance of the engine at medium and low speeds.

Furthermore, since the catalyst does not need to be provided for each of the plurality of first exhaust pipes, an increase in a total heat capacity of the catalyst provided in the exhaust system can be prevented. This can easily raise the temperature of the catalyst. An increase in a total surface area of the catalyst provided in the exhaust system can be prevented. This can prevent the heat quantity radiating from the surface of the catalyst from increasing. As a result, the catalyst can be activated quickly.

A vehicle according to a further preferred embodiment of the present invention includes an engine having a plurality of cylinders, a drive wheel, a transmission mechanism that transmits power generated by the engine to the drive wheel, and an exhaust system that exhausts gas from the plurality of cylinders of the engine, the exhaust system including a same number of first exhaust pipes as the plurality of cylinders, into which the gas exhausted from the plurality of cylinders flows, respectively, a first catalyst device having a first catalyst that cleanses the gas introduced through the plurality of first exhaust pipes, a same number of second exhaust pipes as the plurality of cylinders, which are provided corresponding to the plurality of first exhaust pipes, respectively, a first coupler that assembles first ends of the plurality of first exhaust pipes and couples the first ends to the first catalyst device, and a second coupler that assembles first ends of the plurality of second exhaust pipes and couples the first ends to the first catalyst device. The first coupler has a same number of first inflow portions as the plurality of cylinders that cause the gas flowing out of the plurality of first exhaust pipes to flow into the first catalyst device, respectively, the second coupler has a same number of second inflow portions as the plurality of cylinders that cause the gas flowing out of the first catalyst device to flow into the plurality of second exhaust pipes, respectively, the first coupler is connected to the first catalyst device such that the plurality of first inflow portions are not in communication with each other, the second coupler is connected to the first catalyst device such that the plurality of second inflow portions are not in communication with each other, and the plurality of second inflow portions are arranged so as to be opposed to the plurality of first inflow portions, respectively, with the first catalyst device interposed therebetween.

In the vehicle, the power generated by the engine is transmitted to the drive wheel by the transmission mechanism so as to drive the drive wheel. Furthermore, the above-described exhaust system is connected to the engine. Accordingly, the gas exhausted from the plurality of cylinders of the engine flows into the plurality of first exhaust pipes, respectively. The gas flowing into the plurality of first exhaust pipes flows into the first catalyst device through the plurality of first inflow portions of the first coupler, respectively. The gas cleansed in the first catalyst device flows into the plurality of second exhaust pipes through the plurality of second inflow portions of the second coupler.

The first coupler is connected to the first catalyst device such that the plurality of first inflow portions are not in communication with each other. The second coupler is connected to the first catalyst device such that the plurality of second inflow portions are not in communication with each other. The plurality of second inflow portions are arranged so as to be opposed to the plurality of first inflow portions, respectively, with the first catalyst device interposed therebetween.

In this case, the gas flowing into the first catalyst device from the respective first inflow portions passes through the first catalyst device, and then, flows into the second inflow portions arranged at the opposed positions, respectively. Since the plurality of first inflow portions are not in communication with each other, the gases introduced through the plurality of first exhaust pipes are prevented from interfering with one another in the first coupler when the gases flow into the first catalyst device from the first inflow portions. Furthermore, since the plurality of second inflow portions are not in communication with each other, the gases introduced through the plurality of first exhaust pipes are prevented from interfering with one another in the second coupler when the gases flow into the plurality of second inflow portions from the first catalyst device. Accordingly, even if the first catalyst device is arranged close to the engine in order to cause the high temperature gas to flow into the first catalyst, pressure interference of the gas is prevented from occurring in the coupling portion between the plurality of first exhaust pipes and the first catalyst device and the coupling portion between the first catalyst device and the plurality of the second exhaust pipes. This allows the catalyst to be activated quickly while preventing a reduction in the output performance of the engine at medium and low speeds.

Furthermore, since the catalyst does not need to be provided for each of the plurality of first exhaust pipes, an increase in a total surface area of the catalyst provided in the exhaust system can be prevented. Since this can prevent the heat quantity radiating from the surface of the first catalyst from increasing, the temperature of the first catalyst can be easily raised. As a result, the first catalyst can be activated quickly.

Other features, elements, characteristics, and advantages of the present invention will become more apparent from the following description of preferred embodiments of the present invention with reference to the attached drawings.

BRIEF DESCRIPTION OF THE DRAWINGS

FIG. 9 is a view showing a fitting member.

DETAILED DESCRIPTION OF PREFERRED EMBODIMENTS

Hereinafter, an exhaust system according to preferred embodiments of the present invention, and an engine device and a vehicle with the same are described. In the present preferred embodiment, a motorcycle with an inline four cylinder engine is described as an example but it is in no way limiting of the present invention.

Figure 1:
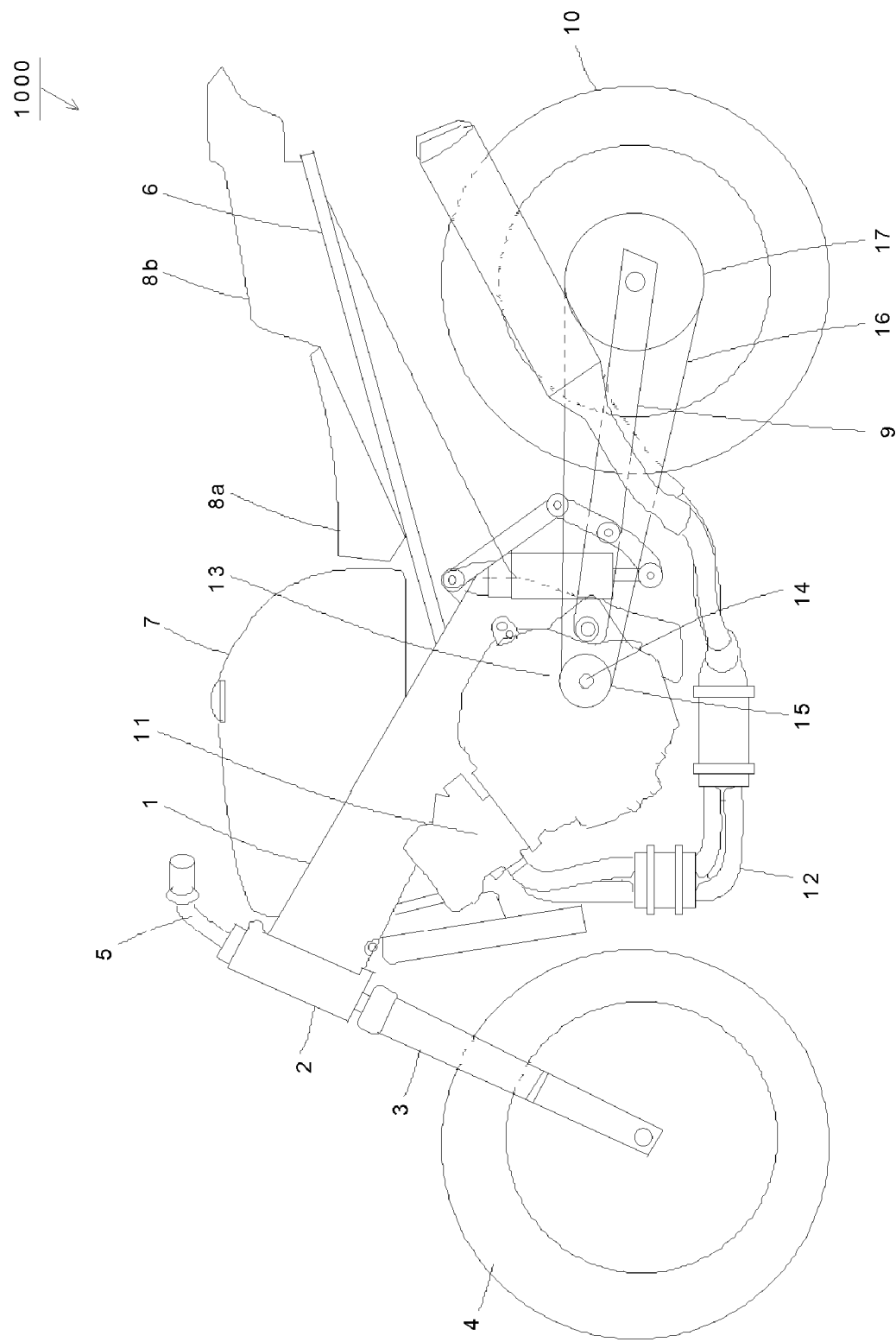
FIG. 1 is a schematic view of a motorcycle according to a preferred embodiment of the present invention.

FIG. 1 is a schematic view of a motorcycle according to a preferred embodiment of the present invention.

In the motorcycle 1000 of FIG. 1, a body frame 1 is provided with a head pipe 2 at its front end. The head pipe 2 is provided with a front fork 3 that can swing left and right. At the lower end of the front fork 3 is a front wheel 4 that is rotatably supported thereon. A handle 5 is mounted at the upper end of the head pipe 2.

A seat rail 6 is mounted to extend rearwardly from the upstream of the back end of the body frame 1. A fuel tank 7 is provided above the body frame 1. A main seat 8a and a tandem seat 8b are provided on the seat rail 6.

A rear arm 9 is mounted to extend rearwardly from the rear end of the body frame 1. A rear wheel 10 is rotatably supported at the rear end of the rear arm 9.

An engine 11 is mounted preferably in the approximate center of the body frame 1. An exhaust system 12 is mounted to exhaust ports of the engine 11.

The engine 11 is coupled to a transmission 13. A drive sprocket 15 is mounted around a drive shaft 14 of the transmission 13. The drive sprocket 15 is coupled via a chain 16 to a rear wheel sprocket 17 of the rear wheel 10.

Figure 2:
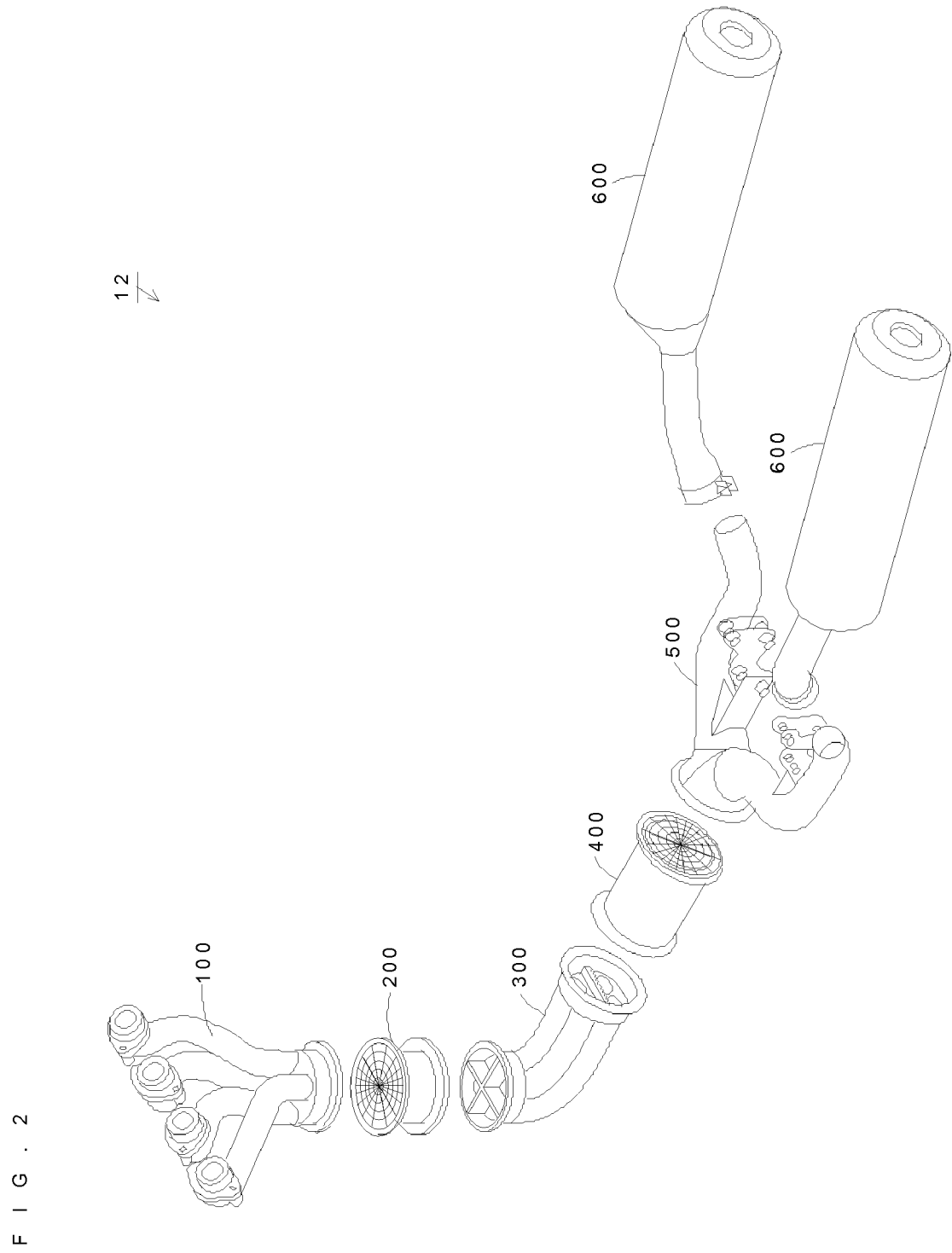
FIG. 2 is an exploded perspective view showing a configuration of an exhaust system of FIG. 1.

Hereinafter, the exhaust system 12 according to the present preferred embodiment is described. FIG. 2 is an exploded perspective view showing a configuration of the exhaust system 12 of FIG. 1.

As shown in FIG. 2, the exhaust system 12 according to the present preferred embodiment includes a first exhaust pipe group 100, a first catalyst device 200, a second exhaust pipe group 300, a second catalyst device 400, a branch pipe 500, and muffler devices 600.

Exhaust gas exhausted from the exhaust ports of respective cylinders of the engine 11 (refer to FIG. 1) flows into the muffler devices 600 through the first exhaust pipe group 100, the first catalyst device 200, the second exhaust pipe group 300, the second catalyst device 400, and the branch pipe 500, and after sound muffling is performed in the muffler devices 600, the exhaust gas is exhausted to the outside. Hereinafter, a further detailed description of the first exhaust pipe group 100, the first catalyst device 200, and the second exhaust pipe group 300 is provided.

Figure 3:
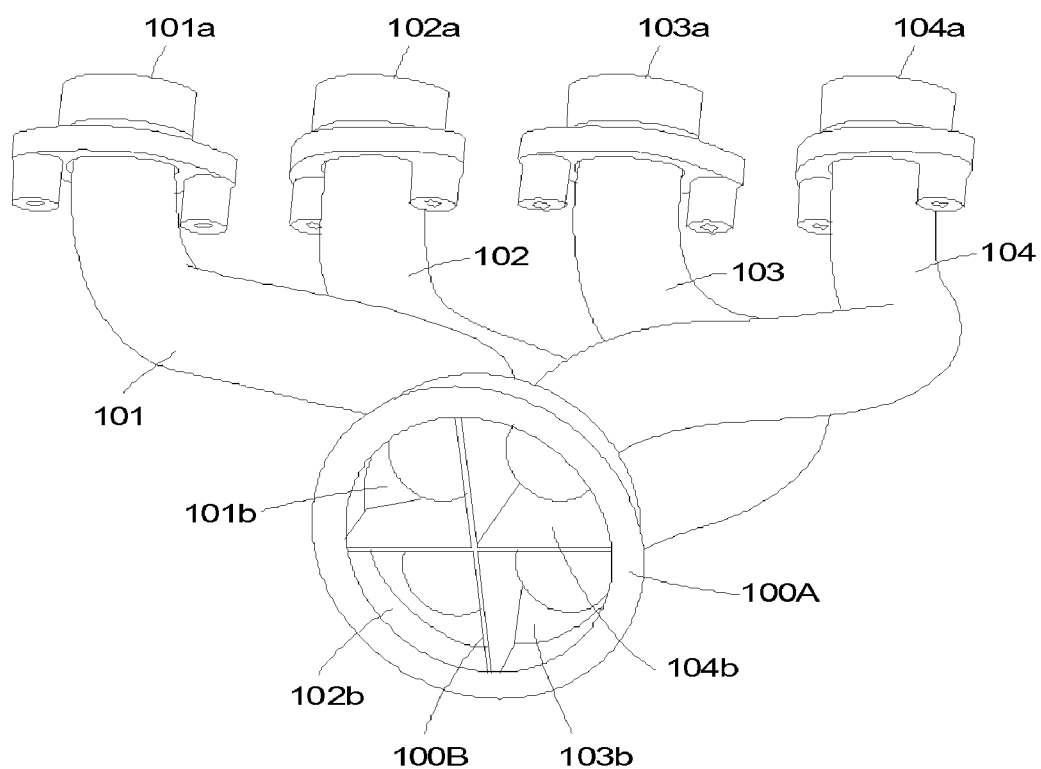
FIG. 3 is a perspective view showing a first exhaust pipe group.

FIG. 3 is a perspective view showing the first exhaust pipe group 100. As shown in FIG. 3, the first exhaust pipe group 100 preferably includes exhaust pipes 101, 102, 103, 104. Coupling portions 101a, 102a, 103a, 104a are provided at first ends of the exhaust pipes 101, 102, 103, 104, respectively. The respective coupling portions 101a, 102a, 103a, 104a are attached to the exhaust ports of the respective cylinders of the engine 11 (refer to FIG. 1).

A coupling pipe 100A is provided at the second end portions of the exhaust pipes 101, 102, 103, 104. In the coupling pipe 100A, four spaces 101b, 102b, 103b, 104b are preferably formed by a cross-shaped partition plate 100B.

Internal spaces of the respective exhaust pipes 101, 102, 103, 104 communicate with the spaces 101b, 102b, 103b, 104b of the coupling pipe 100A, respectively. Since the spaces 101b, 102b, 103b, 104b are not in communication with each other, the exhaust gases from the engine 11 do not interfere with one another in the coupling pipe 100A.

Figure 4A:
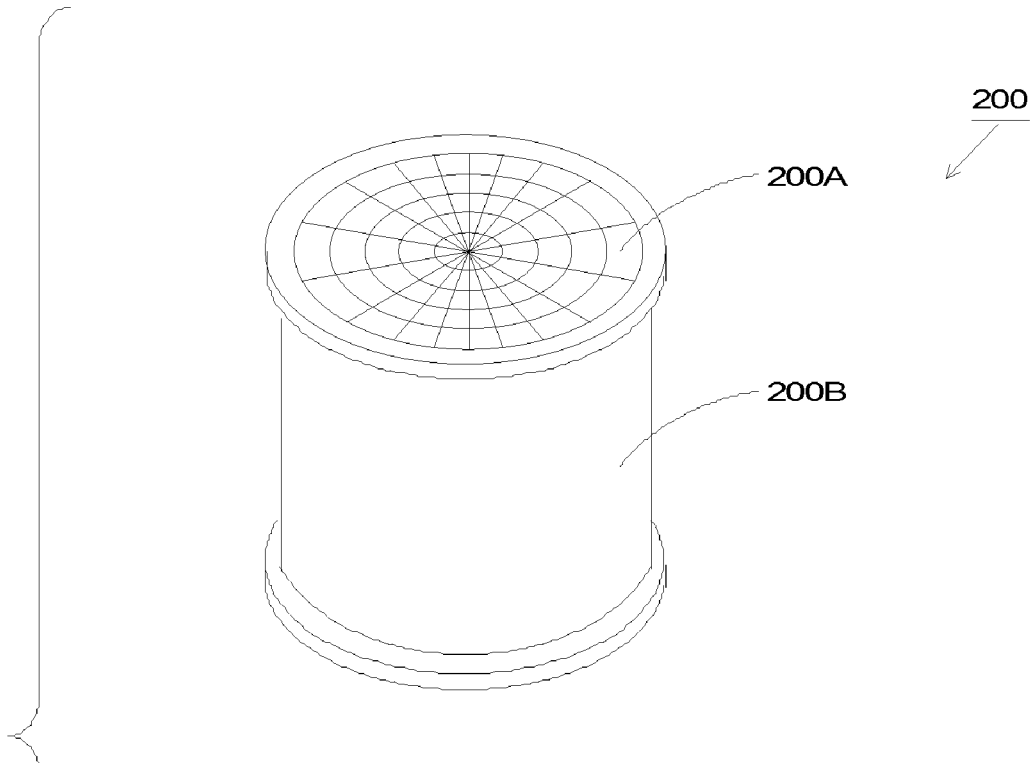
FIGS. 4(a) and 4(b) are views showing a first catalyst device.

FIG. 4(a) is a perspective view showing the first catalyst device 200. As shown in FIG. 4(a), in the first catalyst device 200, a columnar catalyst 200A is contained in a cylindrical catalyst container 200B. In the present preferred embodiment, as the catalyst 200A, a three-way catalyst obtained by applying catalytic metals such as platinum (Pt), palladium (Pd), and rhodium (Rh) to a substrate is preferably used. This catalyst 200A converts HC, CO, and $NO_x$ contained in the exhaust gas of the engine 11 into $CO_2$, $H_2O$, and $N_2$.

Figure 4B:
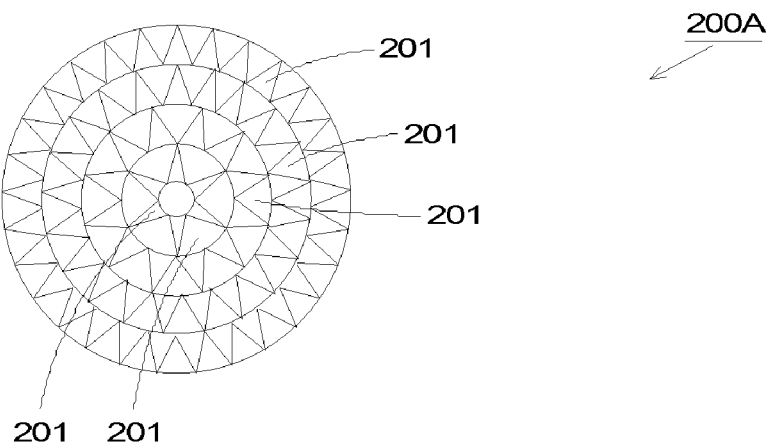

FIG. 4(b) is an enlarged schematic view of an upper surface portion of the catalyst 200A shown in FIG. 4(a). Over an entire surface of the catalyst 200A, there are provided a plurality of flow paths 201 each extending in an axial direction with a substantially triangular cross section as shown in FIG. 4(b). Since the respective flow paths 201 are not in communication with each other, the exhaust gases flowing into the respective flow paths 201 from the first exhaust pipe group 100 (refer to FIG. 1) do not interfere with one another in the first catalyst device 200.

The second catalyst device 400 (refer to FIG. 2) also has a construction similar to the first catalyst device 200. Furthermore, the shape of the cross-section of the flow paths 201 of the catalyst 200A is not limited to triangular, but may be other shapes such as quadrangular or hexagonal, or any other suitable shape.

Figure 5:
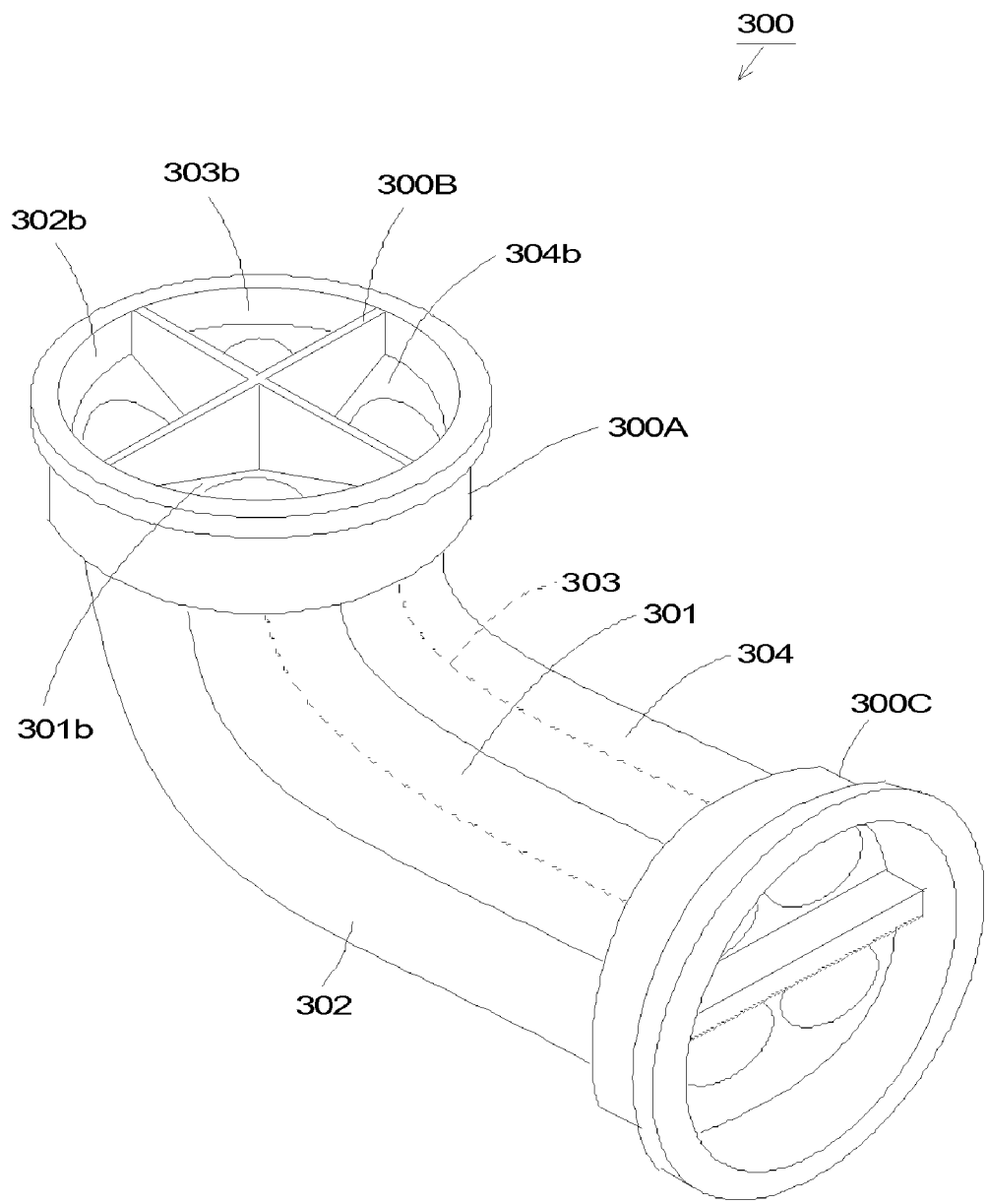
FIG. 5 is a perspective view showing a second exhaust pipe group.

FIG. 5 is a perspective view showing the second exhaust pipe group 300. As shown in FIG. 5, the second exhaust pipe group 300 has exhaust pipes 301, 302, 303, 304. A coupling pipe 300A is provided at first ends of the exhaust pipes 301, 302, 303, 304. In the coupling pipe 300A, four spaces 301b, 302b, 303b, 304b are formed by a cross-shaped partition plate 300B.

Internal spaces of the respective exhaust pipes 301, 302, 303, 304 communicate with the spaces 301b, 302b, 303b, 304b of the coupling pipe 300A, respectively. Since the spaces 301b, 302b, 303b, 304b are not in communication with each other, the exhaust gases flowing from the first catalyst device 200 do not interfere with one another in the coupling pipe 300A.

A coupling pipe 300C is provided at the second end portions of the exhaust pipes 301, 302, 303, 304. The coupling pipe 300C has no partition plate.

Figure 6:
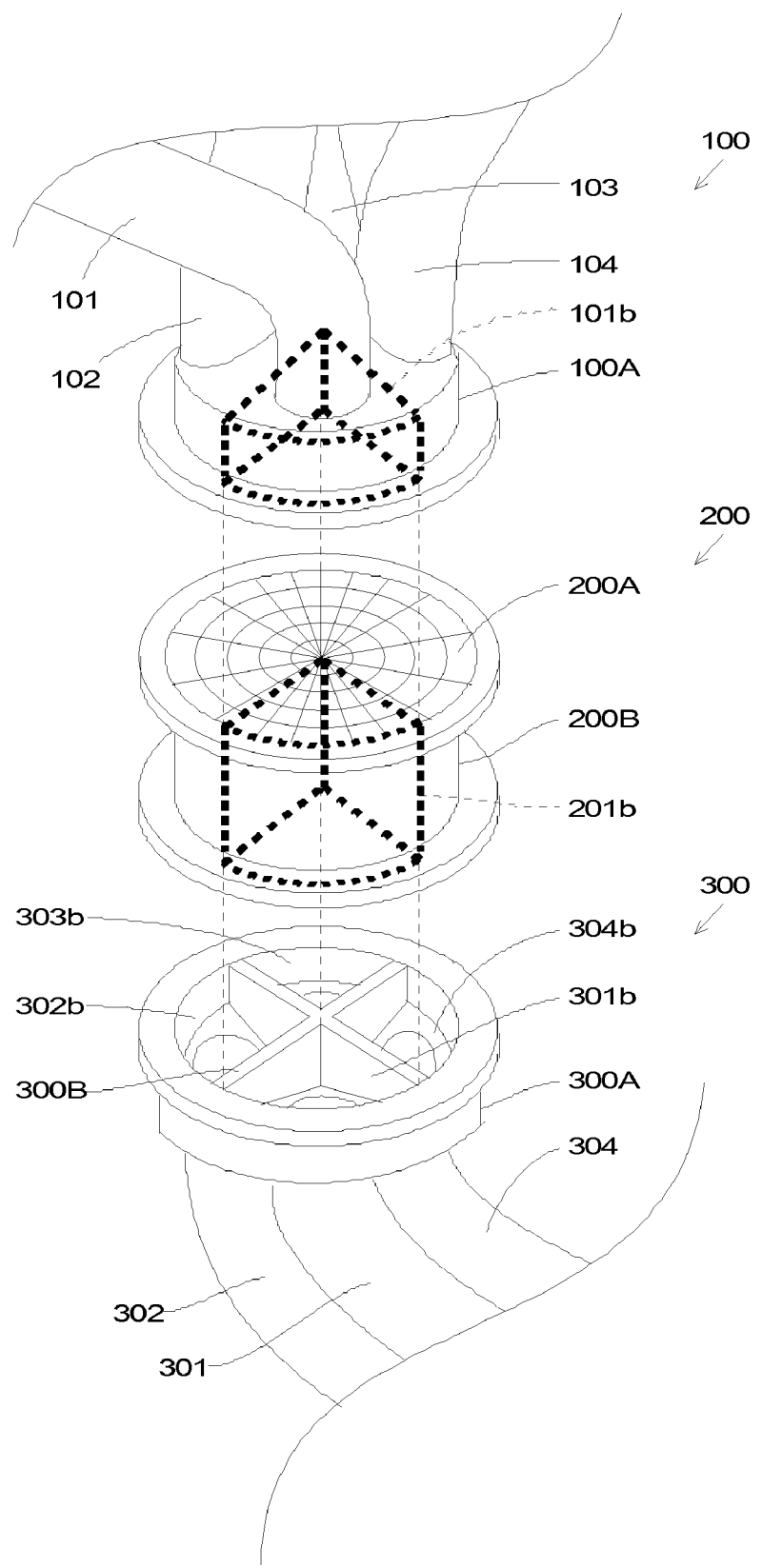
FIG. 6 is a perspective view showing a joining method of the first exhaust pipe group, the first catalyst device, and the second exhaust pipe group.

FIG. 6 is a perspective view showing a joining method of the first exhaust pipe group 100, the first catalyst device 200, and the second exhaust pipe group 300.

As shown in FIG. 6, the first exhaust pipe group 100 and the second exhaust pipe group 300 are joined such that the coupling pipe 100A and the coupling pipe 300A are connected to opposite ends of the catalyst container 200B. The joint between the coupling pipe 100A and the catalyst container 200B, and the joint between the catalyst container 200B and the coupling pipe 300A, may be formed by welding, or by forming flanges on ends of the coupling pipe 100A, the catalyst container 200B, and the coupling pipe 300A, respectively, and joining the flanges with bolts and nuts.

In the first exhaust pipe group 100, the end surface of the coupling pipe 100A (refer to FIG. 3) and an end surface of the partition plate 100B (refer to FIG. 3) are flush with each other. Furthermore, in the second exhaust pipe group 300, the end surface of the coupling pipe 300A (refer to FIG. 5) and an end surface of the partition plate 300B (refer to FIG. 5) are flush with each other. Furthermore, in the first catalyst device 200, an end surface of the catalyst 200A (refer to FIG. 4) and the end surface of the catalyst container 200B (refer to FIG. 4) are flush with each other. Accordingly, when the first exhaust pipe group 100, the first catalyst device 200, and the second exhaust pipe group 300 are joined, there is no clearance between the partition plate 100B and the catalyst 200A, and between the catalyst 200A and the partition plate 300B.

Furthermore, areas of the spaces 101b, 102b, 103b, 104b in contact with the catalyst 200A are equal to areas of the spaces 301b, 302b, 303b, 304b in contact with the catalyst 200A, respectively.

Moreover, the coupling pipe 100A and the coupling pipe 300A are joined to the first catalyst device 200 such that the spaces 101b, 102b, 103b, 104b are opposed to the spaces 301b, 302b, 303b, 304b, respectively.

In this case, the exhaust gas flowing into the space 101b through the exhaust pipe 101 flows into the space 301b and the exhaust pipe 301 through a region 201b of the catalyst 200A, which is interposed between the space 101b and the space 301b, (refer to FIG. 6).

Similarly, the exhaust gas flowing into the space 102b (refer to FIG. 3) flows into the space 302b and the exhaust pipe 302 through a region (not identified) of the catalyst 200A, which is interposed between the space 102b and the space 302b; the exhaust gas flowing into the space 103b (refer to FIG. 3) flows into the space 303b through a region (not identified) of the catalyst 200A which is interposed between the space 103b and the space 303b; and the exhaust gas flowing into the space 104b (refer to FIG. 3) flows into the space 304b through a region (not identified) of the catalyst 200A which is interposed between the space 104b and the space 304b.

Furthermore, as described above, since the plurality of flow paths 201 of the catalyst 200A (refer to FIG. 4(b)) are not in communication with each other, the exhaust gas flowing into one of respective flow paths 201 does not interfere with the exhaust gas flowing into another flow path 201.

Accordingly, the exhaust gases exhausted from the respective exhaust ports of the plurality of cylinders of the engine 11 (refer to FIG. 1) flow into the coupling pipe 300C of the second exhaust pipe group 300 (refer to FIGS. 2 and 5) without interfering with one another. It is not until the exhaust gas reaches this coupling pipe 300C that exhaust gas pressure interference occurs.

As described above, in the present preferred embodiment, no exhaust gas pressure interference occurs in the coupling portion between the first exhaust pipe group 100 and the first catalyst device 200, and the coupling portion between the first catalyst device 200 and the second exhaust pipe group 300. With this, even if the first catalyst device 200 is arranged at a position close to the engine 11, a reduction in the output performance of the engine 11 at medium and low speeds due to exhaust gas pressure interference can be prevented.

Furthermore, since a catalyst does not need to be provided for each of the exhaust pipes 101, 102, 103, 104 of the first exhaust pipe group 100, the cost can be reduced.

Furthermore, a surface area of the catalyst 200A in the present preferred embodiment is smaller than a total surface area of catalysts in the case where a catalyst is provided for each of the exhaust pipes 101, 102, 103, 104. In this case, the heat quantity radiating from the surface of the catalyst 200A can be reduced. More specifically, according to the present preferred embodiment, the heat quantity of the exhaust gas can be held in the first catalyst device 200 more efficiently as compared with the case where a catalyst is provided for each of the exhaust pipes 101, 102, 103, 104. This can easily raise the temperature of the catalyst 200A. As a result, the catalyst 200A can be quickly activated.

Furthermore, the second catalyst 400 is provided between the second exhaust pipe group 300 and the branch pipe 500. This can surely remove harmful substances of the exhaust gas.

It is preferable that components of catalyst metals used in the first catalyst device 200 and the second catalyst device 400 and component ratios thereof are changed as necessary according to the structure of the exhaust system 12.

Furthermore, if it is desired to prevent the exhaust gas pressure interference from occurring in the coupling pipe 300C of the second exhaust pipe group 300 (refer to FIG. 5) according to the performance of the engine 11, the structure of the exhaust system 12, and the like, a partition plate may be provided within the coupling pipe 300C to form four spaces, as in the coupling pipe 100A (refer to FIG. 3) and the coupling pipe 300A (refer to FIG. 5). In this case, since the second catalyst device 400 has a structure similar to the first catalyst device 200, no exhaust gas pressure interference occurs in the second catalyst device 400. Accordingly, the location where the exhaust gas pressure interference occurs can be made farther from the engine 11.

Furthermore, in the configuration shown in FIG. 2, when the location where the exhaust gas pressure interference occurs is closer to engine 11, the length of the exhaust pipes 301, 302, 303, 304 of the second exhaust pipe group 300 can be shorter.

Furthermore, it is preferable that an effective opening area of the catalyst 200A (refer to FIG. 4) is larger than a total cross-sectional area of the exhaust pipes 101, 102, 103, 104. The effective opening area of the catalyst 200A is now described with respect to FIG. 7.

Figure 7:
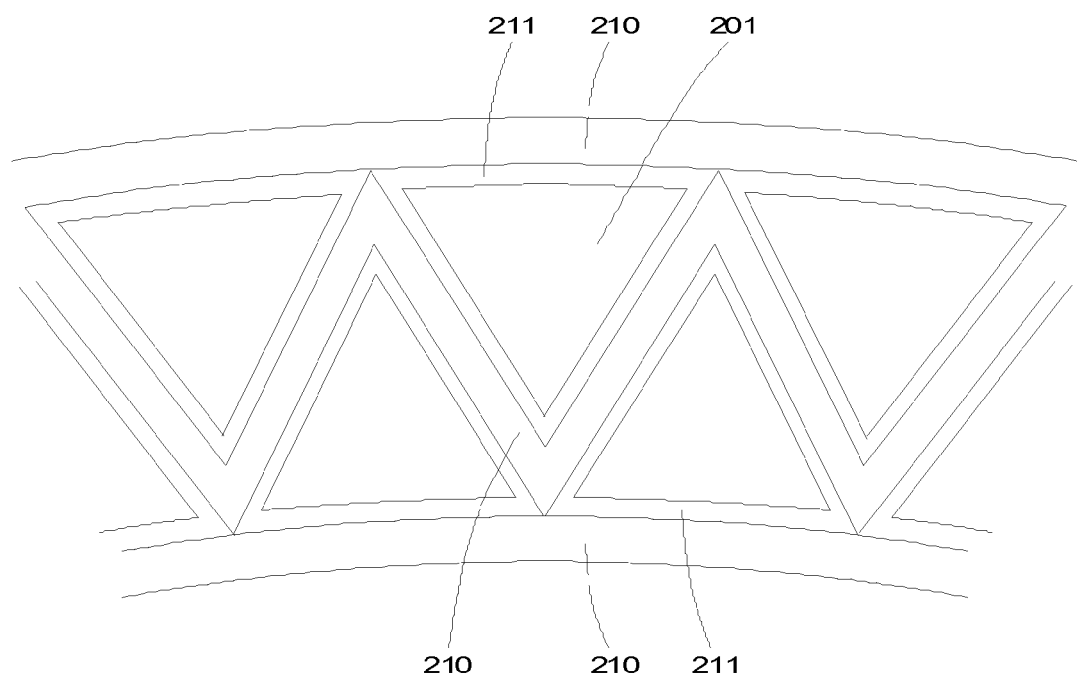
FIG. 7 is a view for explaining an effective opening area of a catalyst.

FIG. 7 is an enlarged schematic view of the flow paths 201 described in FIG. 4(b). As described above, in this example, the three-way catalyst 200A obtained by applying catalyst metals to the substrate 210 having a plurality of openings each having a substantially triangular cross section is preferably used. In this case, as shown in FIG. 7, the flow paths 201 are formed so as to be surrounded by the substrates 210 and metal catalytic layers 211 applied to the substrates. In this example, the cross-sectional shape of each of these flow paths 201 is approximately triangular to obtain an area thereof. A value calculated by multiplying the obtained area by the number of the flow paths 201 formed in the catalyst 200A is an effective opening area. More specifically, in this example, the effective opening area indicates an area of a portion that the exhaust gas can pass through in the catalyst 200A.

Accordingly, by making the effective opening area of the catalyst 200A larger than the total cross-sectional area of the exhaust pipes 101, 102, 103, 104, the exhaust gas flowing into the catalyst 200A can be efficiently passed through the catalyst 200A.

Figure 8:
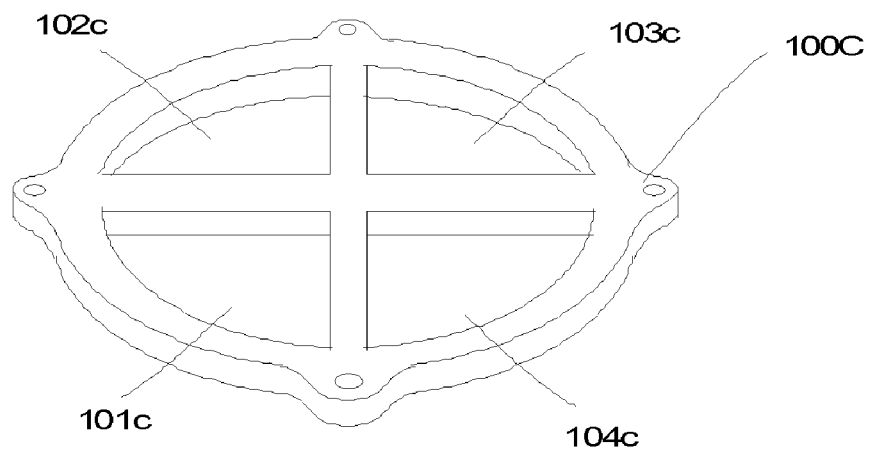
FIG. 8 is a view for explaining one example of a joining method of the first exhaust pipe group and the first catalyst device.
Figure 8:
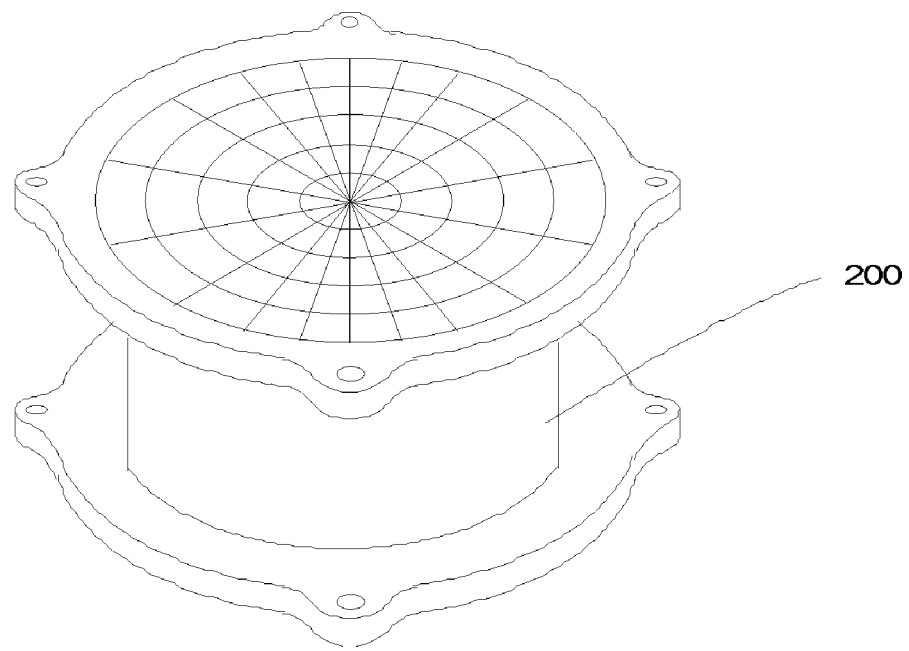
Figure 10:
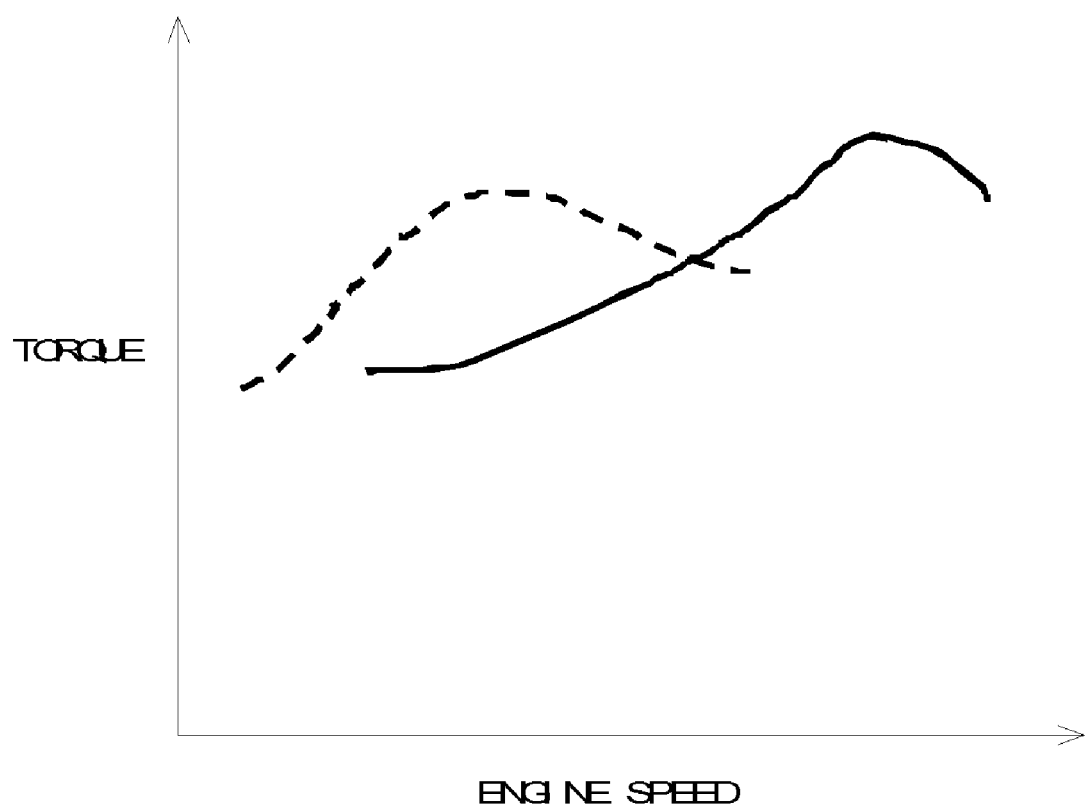
FIG. 10 is a chart for explaining the change in output characteristics of an engine resulting from varying an exhaust pipe length to a merging portion.

Furthermore, the joint between the first exhaust pipe group 100 and the first catalyst device 200 may be formed by using a flange member 100C with openings 101c, 102c, 103c, 104c as shown in FIG. 8. In this case, the respective exhaust pipes 101, 102, 103, 104 and the flange member 100C are welded such that the internal spaces of the respective exhaust pipes 101, 102, 103, 104 (refer to FIG. 3) communicate with the openings 101c, 102c, 103c, 104c, respectively. Furthermore, the joint between the first catalyst device 200 and the second exhaust pipe group 300 can be formed similarly.

Furthermore, cross-shaped fitting members 700 each having grooves as shown in FIG. 9 may be provided on both surfaces of the catalyst 200A, respectively. In this case, the first exhaust pipe group 100, the first catalyst device 200, and the second exhaust pipe group 300 are joined such that the partition plate 100B and the partition plate 300B fit into the grooves of the fitting members 700, respectively.

Furthermore, cross-shaped fitting grooves (not shown) may be provided on both surfaces of the catalyst 200A, respectively. In this case, the first exhaust pipe group 100, the first catalyst device 200, and the second exhaust pipe group 300 are joined such that the partition plate 100B and the partition plate 300B are fit into the fitting grooves, respectively.

Still furthermore, while in the above-described preferred embodiments, the plurality of flow paths 201 of the catalyst 200A are not in communication with each other, a portion of the plurality of flow paths 201 may be in communication with each other to such an extent that the pressure interference of the exhaust gas hardly occurs between the plurality of flow paths 201.

Furthermore, the structure of the joint portions of the first exhaust pipe group 100, the first catalyst device 200, and the second exhaust pipe group 300 is not limited to the above-described examples, but any other structure may be included as long as the exhaust gas pressure interference in the joint portions can be prevented.

Furthermore, the first catalyst device 200 and the second catalyst device 400 may be each formed into a rectangular column, and the coupling pipes 100A, 300A, 300C may be each formed into a hollow rectangular column.

The number of the muffler devices 600 are not limited to two, but may be changed as necessary according to the structure of the motorcycle 1000.

Furthermore, while in the above-described preferred embodiments, a motorcycle with a four cylinder engine is described, the number of the cylinders of the engine is not limited to four, but the exhaust system of preferred embodiments of the present invention can be applied to an engine of any number of cylinders. For example, in the case of a six cylinder engine, six spaces may be provided in each of the coupling pipe 100A and the coupling pipe 300A, so that the exhaust gas pressure interference is prevented from occurring in the first exhaust pipe group 100, the first catalyst device 200, and the second exhaust pipe group 300 as in the above-described preferred embodiments.

More specifically, spaces corresponding to the respective exhaust pipes connected to the plurality of cylinders of the engine are preferably formed in the coupling pipe 100A and the coupling pipe 300A. This can prevent the exhaust gases from the plurality of cylinders from interfering with one another in the first exhaust pipe group 100, the first catalyst device 200, and the second exhaust pipe group 300. As a result, a reduction in the output performance of the engine at medium and low speeds due to exhaust gas pressure interference can be prevented.

Furthermore, while in the above-described preferred embodiments, the case where the exhaust system 12 is applied to the motorcycle is described, the exhaust system 12 may be applied to another vehicle such as a four wheeled vehicle, a three wheeled vehicle, a watercraft such a personal watercraft, a marine vessel such as a boat or ship, or any other suitable vehicle making use of an exhaust system.

While hereinafter, a corresponding example between the respective components in the claims and the respective portions of the preferred embodiments is described, the present invention is not limited to the following example.

In the above-described preferred embodiments, the exhaust pipes 101, 102, 103, 104 preferably correspond to first exhaust pipes, the exhaust pipes 301, 302, 303, 304 preferably correspond to second exhaust pipes, the coupling pipe 100A and the flange member 100C preferably correspond to a first coupler, the coupling pipe 300A preferably corresponds to a second coupler, the spaces 101b, 102b, 103b, 104b or the openings 101c, 102c, 103c 104c preferably correspond to first inflow portions, the spaces 301b, 302b, 303b, 304b preferably correspond to second inflow portions, the coupling pipe 100A preferably corresponds to a first cylindrical body, the partition plate 100B preferably corresponds to a first partition, the coupling pipe 300A preferably corresponds to a second cylindrical body, the partition plate 300B preferably corresponds to a second partition, the coupling pipe 300C preferably corresponds to a third coupler, the rear wheel 10 preferably corresponds to a drive wheel, and the transmission 13, the drive shaft 14, the drive sprocket 15, the chain 16, and the rear-wheel sprocket 17 preferably correspond to a transmission mechanism, as an example only.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An exhaust system for exhausting gas from a plurality of cylinders of an engine, the exhaust system comprising:
   a plurality of first exhaust pipes corresponding in number to the plurality of cylinders, into which the gas exhausted from the plurality of cylinders flows, respectively;
   a first catalyst device having a first catalyst that cleanses the gas introduced from the plurality of first exhaust pipes;
   a plurality of second exhaust pipes corresponding in number to the plurality of cylinders;
   a first coupler arranged to assemble and couple first ends of the plurality of first exhaust pipes to the first catalyst device, the first coupler having a plurality of first inflow portions corresponding in number to the plurality of first exhaust pipes; and
   a second coupler arranged to assemble and couple first ends of the plurality of second exhaust pipes to the first catalyst device, the second coupler having a plurality of second inflow portions corresponding in number to the plurality of second exhaust pipes;
   a third coupler arranged to assemble second ends of the plurality of second exhaust pipes; and a second catalyst device that is connected to the third coupler such that the third coupler couples the second ends of the plurality of second exhaust pipes to the second catalyst device, the second catalyst device having a second catalyst for cleansing the gas introduced from the plurality of second exhaust pipes; wherein the plurality of first inflow portions are not in communication with each other, the plurality of second inflow portions are not in communication with each other, and the plurality of second inflow portions are arranged so as to be opposed to the plurality of first inflow portions, respectively, with the first catalyst device interposed therebetween; and the third coupler does not include a partition such that the gases from the plurality of second exhaust pipes merge together in the third coupler before entering the second catalyst.

2. The exhaust system according to claim 1, wherein the first coupler has a first substantially cylindrical body and a first partition that divides the inside of the first substantially cylindrical body into a number of first inflow portions corresponding in number to the plurality of first exhaust pipes, and the second coupler has a second substantially cylindrical body and a second partition that divides the inside of the second substantially cylindrical body into a number of second inflow portions corresponding in number to the plurality of second exhaust pipes.

3. The exhaust system according to claim 1, wherein an area of each first inflow portion is equal to an area of each second inflow portion opposed to the respective first inflow portion.

4. The exhaust system according to claim 1, wherein the first catalyst has a plurality of flow paths between the first coupler and the second coupler, and the plurality of flow paths are separated and are not in communication with each other.

5. The exhaust system according to claim 4, wherein each of the plurality of flow paths are in communication with a respective first inflow portion and a corresponding second inflow portion opposed to the first inflow portion.

6. An engine device comprising:
an engine having a plurality of cylinders; and
an exhaust system that exhausts gas from the plurality of cylinders of the engine, the exhaust system including:
a plurality of first exhaust pipes corresponding in number to the plurality of cylinders, into which the gas exhausted from the plurality of cylinders flows, respectively;
a first catalyst device having a first catalyst that cleanses the gas introduced from the plurality of first exhaust pipes;
a plurality of second exhaust pipes corresponding in number to the plurality of cylinders;
a first coupler arranged to assemble and couple first ends of the plurality of first exhaust pipes to the first catalyst device, the first coupler having a plurality of first inflow portions corresponding in number to the plurality of first exhaust pipes; and
a second coupler arranged to assemble and couple first ends of the plurality of second exhaust pipes to the first catalyst device, the second coupler having a plurality of second inflow portions corresponding in number to the plurality of second exhaust pipes;
a third coupler arranged to assemble second ends of the plurality of second exhaust pipes; and
a second catalyst device that is connected to the third coupler such that the third coupler couples the second ends of the plurality of second exhaust pipes to the second catalyst device, the second catalyst device having a second catalyst for cleansing the gas introduced from the plurality of second exhaust pipes; wherein the plurality of first inflow portions are not in communication with each other, the plurality of second inflow portions are not in communication with each other, and the plurality of second inflow portions are arranged so as to be opposed to the plurality of first inflow portions, respectively, with the first catalyst device interposed therebetween; and the third coupler does not include a partition such that the gases from the plurality of second exhaust pipes merge together in the third coupler before entering the second catalyst.

7. The engine device according to claim 6, wherein the first coupler has a first substantially cylindrical body and a first partition that divides the inside of the first substantially cylindrical body into a number of first inflow portions corresponding in number to the plurality of first exhaust pipes, and the second coupler has a second substantially cylindrical body and a second partition that divides the inside of the second substantially cylindrical body into a number of second inflow portions corresponding in number to the plurality of second exhaust pipes.

8. The engine device according to claim 6, wherein an area of each first inflow portion is equal to an area of each second inflow portion opposed to the respective first inflow portion.

9. The engine device according to claim 6, wherein the first catalyst has a plurality of flow paths between the first coupler and the second coupler, and the plurality of flow paths are separated and are not in communication with each other.

10. The engine device according to claim 9, wherein each of the plurality of flow paths are in communication with a respective first inflow portion and a corresponding second inflow portion opposed to the first inflow portion.

11. A vehicle comprising:
an engine having a plurality of cylinders;
a drive wheel;
a transmission mechanism that transmits power generated from the engine to the drive wheel; and
an exhaust system that exhausts gas from the plurality of cylinders of the engine, the exhaust system including:
a plurality of first exhaust pipes corresponding in number to the plurality of cylinders, into which the gas exhausted from the plurality of cylinders flows, respectively;
a first catalyst device having a first catalyst that cleanses the gas introduced from the plurality of first exhaust pipes;
a plurality of second exhaust pipes corresponding in number to the plurality of cylinders;
a first coupler arranged to assemble and couple first ends of the plurality of first exhaust pipes to the first catalyst device, the first coupler having a plurality of first inflow portions corresponding in number to the plurality of first exhaust pipes; and
a second coupler arranged to assemble and couple first ends of the plurality of second exhaust pipes to the first catalyst device, the second coupler having a plurality of second inflow portions corresponding in number to the plurality of second exhaust pipes;
a third coupler arranged to assemble second ends of the plurality of second exhaust pipes; and
a second catalyst device that is connected to the third coupler such that the third coupler couples the second ends of the plurality of second exhaust pipes to the second catalyst device, the second catalyst device having a second catalyst for cleansing the gas introduced from the plurality of second exhaust pipes; wherein the plurality of first inflow portions are not in communication with each other, the plurality of second inflow portions are not in communication with each other, and the plurality of second inflow portions are arranged so as to be opposed to the plurality of first inflow portions, respectively, with the first catalyst device interposed therebetween; and the third coupler does not include a partition such that the gases from the plurality of second exhaust pipes merge together in the third coupler before entering the second catalyst.

12. The vehicle according to claim 11, wherein the first coupler has a first substantially cylindrical body and a first partition that divides the inside of the first substantially cylindrical body into a number of first inflow portions corresponding in number to the plurality of first exhaust pipes, and the second coupler has a second substantially cylindrical body and a second partition that divides the inside of the second substantially cylindrical body into a number of second inflow portions corresponding in number to the plurality of second exhaust pipes.

13. The vehicle according to claim 11, wherein an area of each first inflow portion is equal to an area of each second inflow portion opposed to the respective first inflow portion.

14. The vehicle according to claim 11, wherein the first catalyst has a plurality of flow paths between the first coupler and the second coupler, and the plurality of flow paths are separated and are not in communication with each other.

15. The vehicle according to claim 14, wherein each of the plurality of flow paths are in communication with a respective first inflow portion and a corresponding second inflow portion opposed to the first inflow portion.

* * * * *